United States Patent
Koike et al.

(10) Patent No.: US 9,981,479 B2
(45) Date of Patent: May 29, 2018

(54) INK JET COMPOSITION AND INK JET RECORDING METHOD

(71) Applicant: Seiko Epson Corporation, Tokyo (JP)

(72) Inventors: Naoki Koike, Matsumoto (JP); Keiji Iida, Chikuhoku-mura (JP); Jun Ito, Shimosuwa-machi (JP); Kenichiro Kubota, Matsumoto (JP); Makoto Nagase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 14/921,085

(22) Filed: Oct. 23, 2015

(65) Prior Publication Data

US 2016/0115330 A1    Apr. 28, 2016

(30) Foreign Application Priority Data

Oct. 24, 2014  (JP) .................. 2014-217525
Feb. 20, 2015  (JP) .................. 2015-031892

(51) Int. Cl.
| | |
|---|---|
| *B41J 2/21* | (2006.01) |
| *C09D 11/322* | (2014.01) |
| *C09D 11/36* | (2014.01) |
| *C09D 11/38* | (2014.01) |

(52) U.S. Cl.
CPC .......... *B41J 2/2107* (2013.01); *C09D 11/322* (2013.01); *C09D 11/36* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC .................................................. 347/95–105
See application file for complete search history.

(56) References Cited

U.S. PATENT DOCUMENTS

| | | | | |
|---|---|---|---|---|
| 6,613,136 | B1 * | 9/2003 | Arita ................... | C09D 11/322 106/31.58 |
| 6,802,893 | B1 | 10/2004 | Komatsu et al. | |
| 2003/0116055 | A1 | 6/2003 | Kubota et al. | |
| 2005/0020717 | A1 * | 1/2005 | Sasa ..................... | C09D 11/101 522/170 |
| 2007/0270525 | A1 * | 11/2007 | Sugita ................... | C09D 11/36 523/160 |
| 2010/0093900 | A1 * | 4/2010 | Ohya ...................... | B41M 7/00 524/173 |
| 2011/0242241 | A1 * | 10/2011 | Chun ................... | C09D 11/322 347/100 |
| 2011/0315049 | A1 | 12/2011 | Aoki et al. | |
| 2012/0056929 | A1 * | 3/2012 | Sao ....................... | C09D 11/36 347/20 |
| 2012/0306964 | A1 * | 12/2012 | Nakajima ............... | B41J 2/165 347/22 |
| 2013/0050365 | A1 * | 2/2013 | Irita ..................... | C09D 11/54 347/100 |

FOREIGN PATENT DOCUMENTS

| | | |
|---|---|---|
| CN | 102532986 A | 7/2012 |
| JP | 11-310714 A | 11/1999 |
| JP | 2010-018730 A | 1/2010 |
| JP | 2010-043149 A | 2/2010 |
| JP | 2012-012432 A | 1/2012 |
| JP | 2012-046671 A | 3/2012 |

* cited by examiner

Primary Examiner — Manish S Shah
(74) Attorney, Agent, or Firm — Nutter McClennen & Fish LLP; John J. Penny, Jr.; Alex Nagorniy

(57) ABSTRACT

An ink composition includes a solvent containing at least one compound represented by the following general formula (1):

$$R^1O-(R^2O)_m-R^3 \qquad (1)$$

wherein $R^1$ and $R^3$ each independently represent a hydrogen or an alkyl group having from 1 to 4 carbon atoms, $R^2$ represents an alkylene group having 2 or 3 carbon atoms, and m represents an integer of 2 or 3; and a pigment containing Pigment Orange-43 (PO-43) having a volume average particle size of 100 nm or more and 400 nm or less.

13 Claims, No Drawings

INK JET COMPOSITION AND INK JET RECORDING METHOD

BACKGROUND

1. Technical Field

The present invention relates to an ink jet ink composition and an ink jet recording method.

2. Related Art

An ink jet recording apparatus, which records images and characters by attaching ink droplets discharged from a nozzle hole of a recording head onto a recording medium, is known. A recording ink such as ink jet ink, which contains various components, for example, a coloring material, a surfactant, water, an organic solvent, and so on for the above-described recording is also known. Efforts have been made to develop an ink jet ink composition that is an oil-based (non-aqueous) ink composition substantially free of water.

JP-A-2012-012432 discloses, for example, an ink composition containing a hydrocarbon-based solvent, a solvent having an ester group and an ether group, and a miscible solvent for both the above referenced solvents. JP-A-2012-046671 discloses an ink composition combined with an amide-based solvent (ether amides). JP-A-2010-018730 discloses an ink composition containing three types of alcohols which have different boiling points. These types of non-aqueous ink compositions are suitably applicable to a vinyl chloride-based recording medium and are thus commonly used for recording in a so-called signage application such as an outdoor signboard application.

Weather durability of recording products, however, is sometimes insufficient when a non-aqueous ink jet ink composition is used for a signage application. A recording product for a signage application, which is commonly used in an outdoor environment where the recording product is exposed to, for example, rain and sun radiation, requires higher weather durability than a recording product for an indoor application. The inventors have highlighted that ensuring weather durability of orange ink (characteristic ink), among other colors, is important to provide wide-gamut color reproduction.

A coloring material having high weather durability may be used as a means to improve weather durability of an ink jet ink composition. On the other hand, each of a plurality of constituents, such as an ink composition, a recording apparatus, and a recording medium, requires numerous properties for ink jet recording. A superior balance of each of the various constituents is further required. Thus, selecting merely a coloring material having superior weather durability may make other properties unsatisfactory.

The inventors found that it is important to have well-balanced control over a combination of at least the type of pigment, particle size of pigment, and solvent to improve weather durability while maintaining the overall properties of an ink jet ink composition, and thus made the invention.

SUMMARY

An advantage of some aspects of the invention is to provide an ink jet ink composition that can form an image having superior weather durability and have superior stability, quality, and rubbing resistance of the image in ink jet recording.

The invention may overcome at least one of the above-referenced drawbacks and can be realized as an aspect or an application example described below.

Application Example 1

An aspect of an ink jet ink composition of the invention includes a solvent containing at least one compound represented by the following general formula (1):

$$R^1O\text{—}(R^2O)_m\text{—}R^3 \quad (1)$$

wherein $R^1$ and $R^3$ each independently represent a hydrogen or an alkyl group having from 1 to 4 carbon atoms, $R^2$ represents an alkylene group having 2 or 3 carbon atoms, and m represents an integer of 2 or 3; and
a pigment containing Pigment Orange-43 (PO-43) having a volume average particle size of 100 nm or more and 400 nm or less.

The above-described ink jet ink composition can form images having superior weather durability and can provide consistent ink jet recording. The ink jet ink composition further makes it feasible to record images having superior image quality and rubbing resistance.

Application Example 2

The ink jet ink composition according to Application Example 1 may contain 1% by mass or more and 6% by mass or less of the pigment based on the total mass of the ink jet ink composition.

Application Example 3

The total content of the compound represented by general formula (1) may be 10% by mass or more and 90% by mass or less based on the total mass of the ink jet ink composition in the ink jet ink composition according to Application Example 1 or Application Example 2.

Application Example 4

The ink jet ink composition according to any one of Application Example 1 to Application Example 3 may contain 5% by mass or more and 40% by mass or less of a cyclic ester based on the total mass of the ink jet ink composition.

The above-described ink jet ink composition can form images having superior robustness and fixability on a vinyl chloride-based recording medium.

Application Example 5

The ink jet ink composition according to any one of Application Example 1 to Application Example 4 may further contain a vinyl chloride-based polymer.

The above-described ink jet ink composition can provide far superior fixability on a vinyl chloride-based recording medium.

Application Example 6

The ink jet ink composition according to any one of Application Example 1 to Application Example 5 may be used for recording on a vinyl chloride-based recording medium.

Application Example 7

An aspect of an ink jet recording method of the invention provides recording on a vinyl chloride-based recording medium by an ink jet method using the ink jet ink composition according to any one of Application Example 1 to Application Example 6.

The above-described ink jet recording method can form images having superior weather durability and can provide consistent ink jet recording. The ink jet recording method further makes it feasible to record images having superior image quality and robustness.

DESCRIPTION OF EXEMPLARY EMBODIMENTS

Some embodiments of the invention are described below. The below-described embodiment illustrates an example of the invention. The following embodiments should not be construed as limiting the invention in any way, and various modifications can be made without departing from the scope of the invention. Any of the below-described constituents may not be essential constituents of the invention.

1. Ink Jet Ink Composition

An ink jet ink composition of the embodiment contains a solvent and a pigment. The ink jet ink composition of the embodiment is preferably a non-aqueous ink composition and more preferably a solvent-based ink composition containing a volatile solvent (mostly an organic solvent) as a main component. A non-photo-curable ink, which is used for recording by evaporating solvents at an elevated or ambient temperature to fix solid contents onto a recording medium after application, is preferred. A photo-curable ink, which is cured by irradiating with radial rays (light), may be used, whereas non-photo-curable ink is preferred because it does not require irradiation.

A non-aqueous ink composition, whose main solvent component is not water, does not contain water as a functional component for providing functions or properties of an ink. Water content of the non-aqueous ink composition is 5% by mass or less, preferably 3% by mass or less, more preferably 1% by mass or less, further preferably 0.5% by mass or less, and yet further preferably 0.1% by mass or less. Further, the non-aqueous ink composition may not contain water. A solvent content of a solvent-based ink composition is preferably 50% by mass or more and more preferably 70 to 98% by mass.

1-1. Solvent

A solvent contained in the ink jet ink composition of the embodiment contains at least one compound represented by the following general formula (1).

1-1-1. Compound Represented by Formula (1)

The compound is represented by Formula (1):

$$R^1O—(R^2O)_m—R^3 \quad (1)$$

wherein, $R^1$ and $R^3$ each independently represent a hydrogen or an alkyl group having 1 to 4 carbon atoms, $R^2$ represents an alkylene group having 2 or 3 carbon atoms, and m represents an integer of 2 or 3.

The alkyl group having 1 to 4 carbon atoms may be a linear or branched-chain alkyl group and specifically include a methyl group, ethyl group, n-propyl group, iso-propyl group, n-butyl group, sec-butyl group, or tert-butyl group. The alkylene group having 2 or 3 carbon atoms includes an ethylene group (dimethylene) and a propylene group (trimethylene or methyl ethylene). Additionally, the compound represented by general formula (1) is an alkylene glycol alkyl ether. A compound represented by general formula (1) may be solely contained, or two or more of the compounds may be contained, in the composition.

A specific example of the compound represented by general formula (1) includes diethylene glycol methyl ethyl ether (64° C.) (hereinafter abbreviated as "DEGMEE" or "MEDG"), diethylene glycol dimethyl ether (56° C.) (hereinafter abbreviated as "DEGdME"), dipropylene glycol dimethyl ether (65° C.), diethylene glycol diethyl ether (71° C.) (hereinafter abbreviated as "DEGdEE" or "DEDG"), diethylene glycol monomethyl ether (105° C.) (hereinafter abbreviated as "DEGMEE"), diethylene glycol monoisobutyl ether (112° C.), diethylene glycol monoisopropyl ether (101° C.), diethylene glycol monohexyl ether (141° C.), diethylene glycol butyl methyl ether (94° C.) (hereinafter abbreviated as "DEGMEE"), diethylene glycol dibutyl ether (122° C.) (hereinafter abbreviated as "DEGdBE"), dipropylene glycol monopropyl ether (108° C.), dipropylene glycol monobutyl ether (117° C.), triethylene glycol monomethyl ether (139° C.), triethylene glycol monobutyl ether (156° C.), triethylene glycol dimethyl ether (113° C.) (hereinafter abbreviated as "TriEGdME" or "DMTG"), tripropylene glycol monomethyl ether (123° C.), tripropylene glycol monobutyl ether (138° C.), tripropylene glycol dimethyl ether (104° C.), tetraethylene glycol monobutyl ether (177° C.) (hereinafter abbreviated as "TetraEGmBE" or "BTG-H"), and tetraethylene glycol dimethyl ether (141° C.) (hereinafter abbreviated as "TetraEGdME"). The above-referenced numerals within parentheses represent flash points.

In case the flash point determined with a Tag Closed Cup Flash Point Tester is more than 80° C., the flash point of the compound of the embodiment is determined with a Cleveland Open Cup Flash Point Tester. In case the flash point determined with a Tag Closed Cup Flash Point Tester is 80° C. or less, the flash point is determined as follows. The flash point of the compound is determined with a Tag Closed Cup Flash Point Tester when the kinematic viscosity of the solvent at the flash point is less than 10 cSt, and the flash point of the compound is determined with a Seta Closed Cup Flash Point Tester when the kinematic viscosity of the solvent at the flash point is 10 cSt or more.

An above-referenced compound having the flash point of 140° C. or less is preferably used to improve the drying property of the ink jet ink composition. The drying property of the ink jet ink composition is improved by using a compound having a flash point of 140° C. or less, which makes uneven aggregation (for example, pigment aggregation) of the resultant images less likely to occur.

These compounds can be mixed with a solvent to be combined. Preferably, a compound having a flash point of 140° C. or less is combined. Drying of an ink jet ink composition may be retarded when a compound having a flash point of more than 140° C. is solely combined, which improves wetting and spreading properties of the ink on a recording medium, thus providing gloss to the formed images, which can be expected, whereas uneven aggregation (for example, pigment aggregation) may occur on the formed images. On the other hand, the drying property of the ink jet ink composition is improved by a compound having a flash point of 140° C. or less, and thus combining the compound causes uneven aggregation (for example, pigment aggregation) of the formed images less likely to occur. Thus, a well-balanced combination between a compound having a flash point of greater than 140° C. and a compound having a flash point of 140° C. or less can improve gloss of the formed image and suppress uneven aggregation.

The content of a compound (total amount of compounds when a plurality of compounds are used) represented by Formula (1) based on the total mass of the ink jet ink composition is 10% by mass or more and 90% by mass or less, preferably 20% by mass or more and 80% by mass or less, more preferably 30% by mass or more and 75% by mass or less, and further more preferably 40% by mass or more and 70% by mass or less.

The content of an above-referenced compound (total amount of compounds when a plurality of compounds are used) represented by general formula (1) having a flash point of 140° C. or less based on the total mass of the ink jet ink composition is 10% by mass or more and 90% by mass or less, preferably 20% by mass or more and 80% by mass or less, and more preferably 40% by mass or more and 70% by mass or less.

1-1-2. Cyclic Ester

An ink jet ink composition of the embodiment may contain a cyclic ester (cyclic lactone) as a solvent. A cyclic ester may be contained in the ink jet ink composition to cause an ink jet ink composition to infiltrate a recording medium by partially dissolving a recording surface (preferably a recording surface containing a vinyl chloride-based polymer) of a recording medium. Rubbing resistance (rubbing robustness) of the images recorded on a recording medium can thus be improved by infiltrating the recording medium with an ink composition. In other words, a component of the ink jet ink composition can be readily made to permeate (readily adhere to) a recording surface because a cyclic ester is highly compatible with a vinyl chloride-based polymer. An ink jet ink composition combined with a cyclic ester is considered to form images having superior rubbing resistance even under severe circumstances such as the outdoor environment due to the above-described effect of a cyclic ester.

A cyclic ester has a structure resulting from dehydration condensation between a hydroxyl group and a carboxyl group within a single compound having the hydroxyl group and the carboxyl group. A cyclic ester has a heterocycle having two or more of carbon atoms and one oxygen atom. A cyclic ester further has a structure that has a carbonyl group adjacent to an oxygen atom constituting the heterocycle and is a compound collectively known as a lactone.

An illustrative example of a cyclic ester having a simple structure includes β-propiolactone, β-butyrolactone, γ-butyrolactone, γ-valerolactone, γ-caprolactone, σ-valerolactone, and ε-caprolactone. Heterocyclic members of the cyclic ester are not limited to any specific numbers. Further, a heterocyclic member of the cyclic ester can have, for example, any side chain. A sole cyclic ester may be used, or two or more of the cyclic esters mixed together may be used.

An above-referenced cyclic ester having ring members of three or more to seven or less is preferably used, and having ring members of five or six is more preferably used, to improve rubbing resistance of images formed with an ink composition of the embodiment. The cyclic ester more preferably has no side chain in all cases. Specific examples of the cyclic ester include β-butyrolactone, γ-butyrolactone, and γ-valerolactone. The cyclic ester can provide a significantly superior effect to improve rubbing resistance, when attached to a recording medium containing polyvinyl chloride, due to its high compatibility especially with a polyvinyl chloride.

Content of a cyclic ester (total amount of cyclic esters when a plurality of cyclic esters are used) combined with an ink jet ink composition based on the total mass of the ink jet ink composition is 5% by mass or more and 50% by mass or less, preferably 5% by mass or more and 40% by mass or less, and more preferably 10% by mass or more and 30% by mass or less.

1-1-3. Other Solvents

An ink jet ink composition of the embodiment may include the following compound, besides the compound represented by Formula (1), as a solvent.

The above-referenced solvent includes, for example, alcohols (for example, methyl alcohol, ethyl alcohol, propyl alcohol, butyl alcohol, isopropyl alcohol, and fluoroalcohol), ketones (for example, acetone, methyl ethyl ketone, and cyclohexanon), carboxylate esters (for example, methyl acetate, ethyl acetate, propyl acetate, butyl acetate, methyl propionate, and ethyl propionate), ethers (for example, diethyl ether, dipropyl ether, tetrahydrofuran, and dioxane), and polyhydric alcohols (for example, ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane).

As a solvent, (poly)alcohols may also be contained. (Poly)alcohol includes glycerin, propylene glycol, dipropylene glycol, 1,2-butanediol, 1,2-pentanediol, 1,2-hexanediol, 1,2-heptanediol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, and 2-methylpentane-2,4-diol.

The total content of (poly)alcohols contained in an ink jet ink composition based on the total mass of the ink jet ink composition is preferably 0.05% by mass or more and 30% by mass or less and more preferably 0.1% by mass or more and 30% by mass or less to ensure the effect of improving wetting and spreading properties on a recording medium and the infiltration property to reduce unevenness in density and to ensure storage stability and discharge reliability. An image having superior printing density (coloring property) may be obtained due to the content of (poly)alcohols being within the above-referenced ranges, which provides an ink with a superior wetting property, infiltrating property, and drying property. A malfunction such as clogging of a nozzle may be reduced due to the content of (poly)alcohols being within the above-referenced ranges, which provides an ink with an appropriate viscosity.

Amines may be combined with an ink jet ink composition. Amines include, for example, hydroxylamines such as triethanolamine, tripropanolamine, tributanolamine, N,N-dimethyl-2-aminoethanol, and N,N-diethyl-2-aminoethanol. A single or plurality of amines may be used. The total content of amines contained in an ink jet ink composition based on the total mass of an ink jet ink composition is preferably 0.05% by mass or more and 5% by mass or less and more preferably 0.1% by mass or more and 3% by mass or less.

A solvent includes, for example, a higher fatty acid ester such as methyl laurate, isopropyl hexadecanoate (isopropyl palmitate), isopropyl myristate, methyl oleate, ethyl oleate; dibasic acid diester derived from a dicarboxylic acid of an aliphatic hydrocarbon having 2 to 8 carbon atoms (except for carbon atoms of carboxyl groups) diesterified with alkyl groups having 1 to 5 carbon atoms; and an alkylamide (for example, N,N-dimethyldecanamide) that is an amidated (substituents of nitrogen atoms of the amides are each independently a hydrogen atom or an alkyl group having 1 to 4 carbon atoms) monocarboxylic acid of an aliphatic hydrocarbon having 6 to 10 carbon atoms (except for carbon atoms of carboxyl groups).

A single or plurality of the above-referenced "other solvents" can be added to the ink jet ink composition in any combination amount.

1-2. Pigment

An ink jet ink composition of the embodiment contains as a pigment C.I. Pigment Orange-43 (PO-43) having a volume average particle size of 100 nm or more and 400 nm or less.

PO-43 is a pigment having a CAS registry number of 4424-06-0 and a chemical name of bisbenzimidazo[2,1-b: 2',1'-i]benzo[lmn][3,8]phenanthroline-8,17-dione, or 1,8-(1H-benzimidazole-2,1-diylcarbonyl)-5,4-(1H-benzimidazole-2,1-diylcarbonyl)naphthalene. PO-43 has a perinone structure and a common name of "Perinone Orange". The color of PO-43 is brilliant reddish-orange. The acronym "C.I." denotes color index.

PO-43 is commercially available, for example, as "Hostaperm Orange", and as "PV Gast Orange GRL" available from Clariant; "Fasogen Super Orange 6200" manufactured by DIC CORPORATION; and "Lionogen Orange GR-F" manufactured by TOYO INK CO., LTD.

The volume average particle size of PO-43 contained in the ink jet ink composition of the embodiment is 100 nm or more and 400 nm or less, preferably 150 nm or more and 350 nm or less, more preferably 150 nm or more and 300 nm or less, and further more preferably 150 nm or more and 250 nm or less. A volume average particle size of a pigment can be evaluated by a laser diffraction and scattering method. Specifically, an ink made from a specimen (pigment) is diluted with DEGdEE (diethylene glycol diethyl ether) to 1000 ppm or less, and a volume average particle size then determined by measuring the value of a median diameter D50 with a laser diffraction and scattering analyzer (for example, Microtrac UPA250 (manufactured by NIKKISO CO., LTD.)) under a condition of 20° C. When PO-43 having a different volume average particle size is used as a mixture, the volume average particle size of each PO-43 and the volume average particle size of the mixture can be determined.

When PO-43 pigments having different volume average particle sizes are mixed together and used, the preferable volume average particle size of each PO-43 pigment is 100 nm or more and 400 nm or less, the lower limit is more preferably 150 nm or more, and the higher limit is more preferably 350 nm or less, further more preferably 300 nm or less, and even more preferably 250 nm or less.

An ink jet ink composition of the embodiment containing C.I. Pigment Orange-43 (PO-43) having a volume average particle size of 100 nm or more and 400 nm or less as a pigment can provide well-balanced total properties including at least weather durability, printing stability, and rubbing resistance. PO-43 having a volume average particle size less than 100 nm may deteriorate weather durability. On the other hand, PO-43 having a volume average particle size more than 400 nm may deteriorate gloss of an image and may deteriorate printing stability to cause nozzle depletion.

Commercially available PO-43 having a volume average particle size within the above-referenced ranges can be used as is. Volume average particle size can be controlled as follows. After a solvent is mixed (partially or totally), the mixture (pigment-dispersed solvent) can be suitably treated with, for example, a ball mill, bead mill, ultrasonic disintegrator, and/or jet mill to control distribution of particle size and volume average particle size.

The volume average particle size of PO-43 can be controlled by a method that includes providing a pigment having a small primary particle size and dispersing the pigment with various amounts of a dispersant (described below) when the pigment is mixed (partially or totally) with a solvent. A sufficient amount of dispersant can prevent aggregation of primary particles and provide a dispersion of particles having approximately the same particle size as a primary particles, which gives a volume average particle size that corresponds to a small primary particle size. On the other hand, when the amount of an added dispersant is reduced, primary particles aggregate and result in volume average particle size corresponding to the particle size of a secondary particle. In this case, a smaller primary particle size of a used starting pigment is more preferable since a high degree of freedom is given in controlling volume average particle size. When a higher degree of freedom in controlling volume average particle size is required, an obtained pigment can be made smaller by grinding with, for example, a ball mill before controlling average particle size with a dispersant.

Content of PO-43 is 1% by mass or more and 10% by mass or less, preferably 2% by mass or more and 8% by mass or less, and more preferably 3% by mass or more and 7% by mass or less based on the total mass of the ink jet ink composition of the embodiment.

An ink jet ink composition of the embodiment may further contain a coloring material besides the above-referenced PO-43. A coloring material includes a pigment and a dye having a color similar to PO-43, which, for example according to the color index, includes a pigment having a value of C.I. Pigment Orange and a value of C.I. Pigment Red.

1-3. Other Components

An ink jet ink composition of the embodiment may further contain below-described components such as a vinyl chloride-based polymer, surfactant, dispersant.

1-3-1. Vinyl Chloride-Based Polymer

A vinyl chloride-based polymer that can be used in the ink jet ink composition of the embodiment includes a copolymer containing vinyl chloride and vinyl acetate. The copolymer containing vinyl chloride and vinyl acetate can be dissolved in a solvent represented by Formula (1). The copolymer containing vinyl chloride and vinyl acetate dissolved in a solvent represented by Formula (1) can thus make an ink that firmly fixed onto a surface of a recording medium containing a vinyl chloride-based polymer.

A copolymer of vinyl chloride and vinyl acetate can be obtained according to a general method such as suspension polymerization. Specifically, water, a dispersant, and a polymerization initiator are placed into a polymerization vessel, which is then deaerated. Vinyl chloride and vinyl acetate can be pressure injected into the vessel to perform suspension polymerization, or vinyl chloride and vinyl acetate can be pressure injected to initiate a reaction, and suspension polymerization can be performed while the remaining vinyl chloride is pressure injected into the reactant.

A copolymer of vinyl chloride and vinyl acetate preferably contains 70 to 90% by mass of vinyl chloride units as a constituent. The copolymer, being within the above-referenced ranges, is stably dissolved in an ink jet ink composition, which ensures superior long-term storage stability. Superior discharge stability and fixability to a recording medium can be further obtained.

A copolymer of vinyl chloride and vinyl acetate may optionally contain, in conjunction with vinyl chloride units and vinyl acetate units, other constitutional units, which include, for example, a carboxylic acid unit, a vinyl alcohol unit, and a hydroxyalkyl acrylate unit, and preferably a vinyl alcohol unit. The copolymers can be obtained by using monomers corresponding to the above-referenced units. Specific examples of monomers giving carboxylic acid units include, for example, maleic acid, itaconic acid, maleic anhydride, itaconic anhydride, acrylic acid, and methacrylic acid. Specific examples of monomers giving hydroxyalkyl acrylate units include, for example, hydroxyethyl(meth) acrylate and hydroxyethyl vinyl ether. Content of the monomers is not limited as long as the effects of the invention are not diminished. The monomers can be copolymerized when the content of the monomers is in the range of 15% by mass or less based on total mass of the monomers.

Commercially available copolymers of vinyl chloride and vinyl acetate include, for example, Solbin CN, Solbin CNL, Solbin C5R, Solbin TA5R, and Solbin CL (all manufactured by Nissin Chemical Industry Co., Ltd).

A mean degree of polymerization of a copolymer containing vinyl chloride and vinyl acetate is preferably, but not limited to, 150 to 1100 and more preferably 200 to 750. When a mean degree of polymerization of a copolymer containing vinyl chloride and vinyl acetate is within the above-referenced ranges, the polymer is stably dissolved in the ink composition of the embodiment to ensure superior long-term storage stability. Superior discharge stability and fixability to a recording medium can be further obtained. A mean degree of polymerization of a copolymer containing vinyl chloride and vinyl acetate is calculated by measuring specific viscosity and can be calculated in accordance with the mean degree of polymerization calculation method described in "JIS K 6720-2".

The number average molecular weight of a copolymer containing vinyl chloride and vinyl acetate is preferably, but not limited to, 10000 to 50000 and more preferably 12000 to 42000. Number average molecular weight can be measured by GPC and calculated to a relative value using polystyrene standards.

Content of the copolymer containing vinyl chloride and vinyl acetate (vinyl chloride-based polymer) in an ink jet ink composition of the embodiment can be, for example, 0.05% by mass or more and 6% by mass or less and preferably 0.5% by mass or more and 4% by mass or less. When the content of the copolymer containing vinyl chloride and vinyl acetate is within the above-referenced ranges, superior fixability to a recording medium such as a vinyl chloride-based polymer can be obtained due to the copolymer containing vinyl chloride and vinyl acetate dissolved in a solvent represented by general formula (1).

A ink jet ink composition of the embodiment preferably contains a copolymer containing vinyl chloride and vinyl acetate and a solvent represented by general formula (1) at a mass ratio of 1:5 to 1:40. When the ratio is within the above-referenced ranges, the copolymer containing vinyl chloride and vinyl acetate can be readily dissolved in a solvent represented by Formula (1), which ensures improvement of ink fixability to a recording medium containing a vinyl chloride-based polymer and ensures resistance to clogging of a nozzle.

1-3-2. Others

Surfactant

To the ink jet ink composition of the embodiment may be added, besides the above-referenced organic solvent, a polyoxyethylene derivative, which is a silicon-based surfactant, a fluorine-based surfactant, or a nonionic surfactant, to reduce surface tension, which ensures improved wetting of a recording medium.

A used silicon-based surfactant is preferably a polyester-modified silicon and polyether-modified silicon. Specific examples include BYK-347, 348, BYK-UV3500, 3510, 3530, and 3570 (all manufactured by BYK Japan KK).

A used fluorine-based surfactant is preferably a fluorine-modified polymer. A specific example includes BYK-340 (manufactured by BYK Japan KK).

A used polyoxyethylene derivative is preferably an acetylene glycol-based surfactant. Specific examples include, for example, Surfynol 82, 104, 465, 485, and TG (all manufactured by Air Products Japan, Inc.); Olfine STG, and E1010 (all manufactured by Nissin Chemical Industry Co., Ltd); NISSAN NONION A-10R and A-13R (all manufactured by NOF CORPORATION); FLOWLEN TG-740W, and D-90 (manufactured by Kyoeisha Chemical Co., Ltd.); NOIGEN CX-100 (manufactured by DKS Co. Ltd.).

Surfactant content of the ink jet ink composition of the embodiment is preferably 0.05% by mass or more and 3% by mass or less and more preferably 0.5% by mass or more and 2% by mass or less.

Dispersant

Any dispersant generally used in a common ink composition can be used in an ink jet ink composition of the embodiment to improve dispersing stability of a pigment. Specific examples of the dispersant include a polyester-based polymer compound such as Hinoact KF1-M, T-6000, T-7000, T-8000, T-8350P, and T-8000E (all manufactured by Takefu Fine Chemicals Co., Ltd.); Solsperse 20000, 24000, 32000, 32500, 33500, 34000, 35200, and 37500 ("Solsperse", all manufactured by The Lubrizol Corporation); Disperbyk-161, 162, 163, 164, 166, 180, 190, 191, and 192 (all manufactured by BYK Japan KK); FLOWLEN DOPA-17, 22, 33, and G-700 (all manufactured by Kyoeisha Chemical Co., Ltd.); AJISPER PB821, and PB711 (all manufactured by Ajinomoto Co., Inc.); and LP 4010, LP 4050, LP 4055, POLYMER 400, 401, 402, 403, 450, 451, and 453 (all manufactured by Efka CHEMICALS).

A used dispersant may be, for example, a metallic soap or a polymer dispersant having a basic group and is preferably a polymer dispersant having a basic group. A dispersant having an amino group, an imino group, or a pyrrolidone group as a basic group is more preferable. A used polymer dispersant having a basic group includes, for example, a polyalkylene polyamine, a salt of a long chain polyamino amide and a high molecular weight acid ester, a salt of a polyamino amide and a polar acid ester, a modified polyurethane, and a polyester polyamine.

Specific examples of a polymer dispersant having a basic group include "Anti-Terra-U (a polyamino amide phosphoric acid salt)" available from BYK-Chemie GmbH, "Anti-Terra-204 (a high molecular weight polycarboxylic acid salt)", "Disperbyk-101 (a polyamino amide phosphoric acid salt and an acid ester), and 130 (polyamide). A polymer dispersant also includes SOLSPERSE 5000 (phthalocyanine ammonium salts), 13940 (polyester polyimine), 17000, 18000, 19000 (polyester polyamine), and 11200 (polyester polyimine) manufactured by Avecia Ltd. The dispersant also includes V-216 and V-220 (a polyvinylpyrrolidone having a long chain alkyl group) manufactured by International Specialty Products Inc.

Content of the used dispersant can be suitably selected, for the ink composition of the embodiment, and is preferably 5 parts by mass or more and 200 parts by mass or less and more preferably 30 parts by mass or more and 120 parts by mass or less based on the content of 100 parts by mass of a pigment in the ink composition.

Others

An ink jet ink composition of the embodiment may contain a substance, besides the above-referenced components, providing designated properties, for example, a chelating agent such as ethylenediaminetetraacetate (EDTA), an antiseptic/fungicide, and an antirust.

1-4. Actions and Effects

An ink jet ink composition of the embodiment is a solvent ink containing a solvent of general formula (1) to provide superior image quality when recorded onto a film medium such as a vinyl chloride-based recording medium, and thus the ink composition is especially suitable for use as, for example, an outdoor signage application. When the ink composition is used for, for example, an outdoor signage application, weather durability of an image is greatly superior because an ink jet ink composition of the embodiment contains Pigment Orange-43 having a certain volume average particle size. Further, discharge stability from an ink jet recording head can be ensured to prevent nozzle depletion.

2. Ink Jet Recording Method

An ink jet recording method of the embodiment includes recording on a vinyl chloride-based recording medium by an ink jet method using the above-referenced ink jet ink composition. An ink jet recording method of the embodiment uses the above-referenced ink jet ink composition, which can form an image having superior weather durability and can provide consistent ink jet recording. The ink jet ink composition further makes it feasible to record images having superior image quality and robustness.

The above-referenced ink jet ink composition contains a solvent represented by general formula (1), and the solvent interacts with a vinyl chloride-based polymer. The ink jet recording method of the embodiment is thus superior because an ink is firmly fixed onto a surface of a recording medium by attaching droplets of an ink jet ink composition to a surface of a vinyl chloride-based recording medium to record an image.

A vinyl chloride-based recording medium included in the ink jet recording method of the embodiment is not limited as long as it contains a vinyl chloride-based polymer. A recording medium containing a vinyl chloride-based polymer includes, for example, a rigid or flexible vinyl chloride-based film or sheet. The above-referenced ink jet ink composition allows recording of an image onto an untreated surface of a vinyl chloride-based polymer substrate. The ink composition has an outstanding benefit of being able to avoid the use of an expensive recording medium as a recording medium having a conventional receptive layer. It should be understood that a substrate having a surface treated with an ink receptive layer can also be used.

An ink jet recording apparatus used in the ink jet recording method of the embodiment is preferably, but not limited to, a drop-on-demand type ink jet recording apparatus. A drop-on-demand type ink jet recording apparatus employs, for example, a piezoelectric recording method using a piezoelectric device placed on a recording head to record or a thermal jet recording method using thermal energy of, for example, a resistance heater element placed on recording head to record, and any of these recording methods can be employed. An ink jet ink composition of the embodiment is advantageously inert to a surface of an ink-repellent-treated discharge nozzle, and thus, for example, can be advantageously used for an ink jet recording method which discharge the ink composition from an ink jet recording head having an ink-repellent-treated discharge nozzle surface.

3. Examples and Comparative Examples

The following Examples and Comparative Examples are given below for the purpose of further description and should not be construed as limiting the invention in any way.
3-1. Preparation of Ink Composition
3-1-1. Preparation of Pigment Dispersion Pigment Orange 43 (PO-43) having a primary particle size of 160 nm is provided as a pigment. A dispersion is prepared using Solsperse 17000 (manufactured by The Lubrizol Corporation, polyester polyamine) as a dispersant by varying the amount of the dispersant added at a mass ratio in the range of between 0.1 to 20% by mass based on the pigment, and thus a pigment is dispersed to obtain a dispersion having a desired volume average particle size. A pigment dispersant is prepared by using a solvent constituting the largest content for each ink constitution example as a dispersion medium. PO-43 having a volume average particle size smaller than the primary particle size is obtained by a milling process using a ball mill to give PO-43 having a desired volume average particle size.

Pigment Orange 31, 64, and 71 are treated by the same process to give pigments having a desired volume average particle size.

Volume average particle size of a pigment was evaluated as follows. Obtained pigment dispersants were diluted with diethylene glycol diethyl ether to 1000 ppm or less, and the volume average particle size was then determined by measuring the value of volume average particle size (median diameter D50) by a laser diffraction and scattering method (Microtrac UPA250 (manufactured by NIKKISO CO., LTD.)) under a condition of 20° C.
3-1-2. Preparation of Ink Composition The prepared pigment dispersant described above was used to prepare an ink composition having a different type of pigment and volume average particle size with material constitution given in Table 2 to Table 4. Each ink composition is prepared as follows. Materials given in the tables were placed in a vessel and mixed and stirred for two hours with a magnetic stirrer. Impurities such as dust and coarse particles of the resultant mixture were filtrated with a membrane filter having a pore size of 5 μm to give the ink composition. Numerals of composition column in Table 2 to 4 represent mass %.
3-2. Evaluation Test
3-2-1. Weather Durability Printing was performed using each of the above-prepared ink compositions with an ink jet printer (manufactured by Seiko Epson Corporation, model "PX-G930") while controlling duty to be an initial OD value of 0.5, 1.0, and maximum. A polyvinyl chloride sheet with a gloss surface (Roland DG Corporation, model SV-G-1270G) was used as a recording medium. The obtained recording product was allowed to dry under ambient conditions for 1 hour. The obtained recording product was then put inside a chamber of a Xenon Weather Meter (manufactured by Suga Test Instruments Co., Ltd.) and subjected to a cycle test of "40 minutes of light irradiation", "20 minutes of light irradiation and pseudo-rainfall", "60 minutes of light irradiation", and "60 minutes of pseudo-rainfall" under the test condition given in Table 1 below. The cycle test was continued for 4 weeks, and then the recording product was removed 4 weeks after starting the test. The reduction ratio in the OD value of each recording product was calculated by measuring the OD value by using a Gretag Densitometer (manufactured by GretagMacbeth LLC). The recording product having the lowest reduction ratio among the three recording products, which have initial OD values of 0.5, 1.0, and maximum, was used for evaluation. Weather durability was decided by the criteria given below. The results are collectively presented in Table 2 to Table 4.

5: OD value reduction ratio is 90% or more.
4: OD value reduction ratio is 87% or more and less than 90%.
3: OD value reduction ratio is 84% or more and less than 87%.
2: OD value reduction ratio is 81% or more and less than 84%.
1: OD value reduction ratio is less than 81%.

TABLE 1

| Cycle segment | Time (min.) | Irradiation Intensity at 340 nm (W/m$^2$) | Irradiation Intensity at 300-400 nm (W/m$^2$) | BPT (° C.) | Oven temperature (° C.) | Relative humidity (%) | Pure water spraying |
|---|---|---|---|---|---|---|---|
| 1 | 40 | 0.55 ± 0.02 | 60 ± 2 | 63 ± 2 | 40 ± 2 | 50 ± 6 | None |
| 2 | 20 | 0.55 ± 0.02 | 60 ± 2 | 63 ± 2 | 40 ± 2 | — | Front |
| 3 | 60 | 0.55 ± 0.02 | 60 ± 2 | 63 ± 2 | 40 ± 2 | 50 ± 6 | None |
| 4 | 60 | 0 | 0 | 38 ± 2 | 38 ± 2 | — | Front |

3-2-2. Printing Stability (Intermittent Evaluation)

The oscillation frequency of a piezoelectric element of an ink jet printer (manufactured by Seiko Epson Corporation, model "PX-G930") was set to 5 kHz, and the waveform was optimized. Droplets of each ink composition were continuously discharged from each nozzle of a head for 300 seconds, followed by an interruption of discharging the droplets for 300 seconds (1 sequence). The sequence consisting of the operation of continuous discharge and interruption of discharge of the droplets was then repeated 10 times in the same manner. Printing stability was evaluated (intermittent evaluation) by counting the non-discharging nozzles of 360 nozzles at the end of repeating the sequence 10 times. The evaluation results are collectively presented in Table 2 to Table 4. The criteria of the evaluation are given below.
4: Non-discharging nozzle is 0.
3: Non-discharging nozzle is 1 to 2.
2: Non-discharging nozzle is 3 to 4.
1: Non-discharging nozzle is 5 or more.

3-2-3. Glossiness (Image Quality)

A solid image of each ink composition of Examples and Comparative Examples was printed at a recording resolution of 720*720 dpi and a density of 100% on a polyvinyl chloride sheet with a gloss surface (Roland DG Corporation, model SV-G-1270G) using the above-reference printer. A recording product of each of the Examples was prepared by drying the ink composition under a condition of 25° C. and 65% RH (relative humidity) for 1 day. A gloss condition of the recording product thus obtained was measured using a MULTI Gloss 268 Gloss Meter (manufactured by KONICA MINOLTA, INC.) at a measurement geometry of a 20° reflection angle with the recording surface. The evaluation results are collectively presented in Table 2 to Table 4. The criteria of the evaluation are given below.
4: 50 or more
3: 40 or more and less than 50
2: 30 or more and less than 40
1: less than 30

3-2-4. Uneven Aggregation

A recording product of each of the Examples was prepared by the same process of the "3-2-3. Glossiness (image quality)". Uneven aggregation of a pigment on the recording surface of the recording product was evaluated by visual inspection of the uneven aggregation. The evaluation results are collectively presented in Table 2 to Table 4. The criteria of the evaluation are given below.
4: No uneven aggregation observed.
3: Uneven aggregation observed by magnified inspection.
2: Some uneven aggregation observed.
1: Remarkable uneven aggregation observed.

3-2-5. Rubbing Resistance

A recording product of each of the Examples was prepared by the same process of the "3-2-3. Glossiness (image quality)". Rubbing resistance of the recording product thus obtained was evaluated in accordance with JIS K5701 (ISO 11628) using a Gakushin-Type Color Fastness Rubbing Tester (manufactured by TESTER SANGYO CO., LTD., trade name "AB-301") as follows. A recording surface of a recording product was rubbed with a load of 500 g and 20 reciprocation cycles with a cotton cloth, which was placed on a recording surface of a recording product. Peeling extent of the recording surface of the recording product was then evaluated by visual inspection. The evaluation results are collectively presented in Table 2 to Table 4. The criteria of the evaluation are given below.
3: No stain present on cotton cloth. No scratches present on recording surface.
2: Recording product present on cotton cloth. Few scratches present on recording surface.
1: Recording product present on cotton cloth. Scratches present on recording surface.

3-3. Evaluation Result

Ink constitutions of Examples and Comparative Examples and the evaluation results are presented in Table 2 to Table 4. Evaluation results represented in Table 2 to Table 4 demonstrate that the ink jet ink composition of an aspect of the invention can provide an image having superior weather durability and can provide consistent ink jet recording. The ink jet ink composition further makes it feasible to record images having superior image quality and rubbing resistance.

TABLE 2

| | | | Particle size [nm] | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Pigment | PO-43 | | 47 | | | | | | | | | | |
| | | | 105 | | 4.0 | | | 2.0 | | | | | |
| | | | 199 | 4.0 | | | | | 6.0 | 7.0 | 4.0 | 4.0 | 4.0 |
| | | | 346 | | | 4.0 | | | | | | | |
| | | | 398 | | | | 4.0 | 2.0 | | | | | |
| | | | 494 | | | | | | | | | | |
| | PO-31 | | 197 | | | | | | | | | | |
| | PO-64 | | 203 | | | | | | | | | | |
| | PO-71 | | 196 | | | | | | | | | | |

TABLE 2-continued

| | | Particle size [nm] | Example 1 | 2 | 3 | 4 | 5 | 6 | 7 | 8 | 9 | 10 |
|---|---|---|---|---|---|---|---|---|---|---|---|---|
| Cyclic ester | Gamma-butyrolactone | | 20.0 | 20.0 | 20.0 | 20.0 | 20.0 | 20.0 | 20.0 | | | 20.0 |
| | Sigma-valerolactone | | | | | | | | | 20.0 | | |
| Solvent | DEGMEE (Flash point 64° C.) MEDG | | 69.0 | 69.0 | 69.0 | 69.0 | 69.0 | 67.0 | 66.0 | 69.0 | 89.0 | 9.0 |
| | DEGdME (Flash point 56° C.) | | | | | | | | | | | |
| | DEGDEE (Flash point 71° C.) DEDG | | | | | | | | | | | |
| | DEGBME (Flash point 94° C.) | | | | | | | | | | | |
| | TriEGdME (Flash point 113° C.) DMTG | | | | | | | | | | | |
| | TetraEGdME (Flash point 141° C.) | | | | | | | | | | | 60.0 |
| | TetraEGmBe (Flash point 177° C.) BTG-H | | | | | | | | | | | |
| Dispersant | Solsperse 17000 | | 4.0 | 4.0 | 4.0 | 4.0 | 4.0 | 4.0 | 4.0 | 4.0 | 4.0 | 4.0 |
| Surfactant | BYK340 | | 1.5 | 1.5 | 1.5 | 1.5 | 1.5 | 1.5 | 1.5 | 1.5 | 1.5 | 1.5 |
| Fixing resin | Solbin CL | | 1.5 | 1.5 | 1.5 | 1.5 | 1.5 | 1.5 | 1.5 | 1.5 | 1.5 | 1.5 |
| | Total | | 100 | 100 | 100 | 100 | 100 | 100 | 100 | 100 | 100 | 100 |
| Evaluation result | Weather durability | | 5 | 3 | 5 | 5 | 4 | 5 | 5 | 5 | 5 | 5 |
| | Printing stability (Intermittent evaluation) | | 4 | 4 | 3 | 2 | 3 | 3 | 2 | 4 | 4 | 4 |
| | Glossiness (Image quality) | | 4 | 4 | 4 | 4 | 4 | 4 | 4 | 3 | 4 | 4 |
| | Uneven aggregation | | 4 | 4 | 4 | 4 | 4 | 4 | 4 | 4 | 4 | 2 |
| | Rubbing resistance | | 3 | 3 | 2 | 2 | 3 | 3 | 3 | 3 | 1 | 3 |

TABLE 3

| | | Particle size [nm] | Example 11 | 12 | 13 | 14 | 15 | 16 | 17 | 18 | 19 | 20 | 21 |
|---|---|---|---|---|---|---|---|---|---|---|---|---|---|
| Pigment | PO-43 | 47 | | | | | | | | | | | |
| | | 105 | | | | | | | | | | | |
| | | 199 | 4.0 | 4.0 | 4.0 | 4.0 | 4.0 | 4.0 | 4.0 | 4.0 | 4.0 | 4.0 | 4.0 |
| | | 346 | | | | | | | | | | | |
| | | 398 | | | | | | | | | | | |
| | | 494 | | | | | | | | | | | |
| | PO-31 | 197 | | | | | | | | | | | |
| | PO-64 | 203 | | | | | | | | | | | |
| | PO-71 | 196 | | | | | | | | | | | |
| Cyclic ester | Gamma-butyrolactone | | 50.0 | 20.0 | 20.0 | 20.0 | 20.0 | 5.0 | 40.0 | 20.0 | 20.0 | 20.0 | 20.0 |
| | Sigma-valerolactone | | | | | | | | | | | | |
| Solvent | DEGMEE (Flash point 64° C.) MEDG | | 39.0 | | | | | 84.0 | 49.0 | 39.0 | 10.0 | 10.0 | 60.0 |
| | DEGdME (Flash point 56° C.) | | | 69.0 | | | | | | | | | |
| | DEGDEE (Flash point 71° C.) DEDG | | | | 69.0 | | | | | | | | |
| | DEGBME (Flash point 94° C.) | | | | | 69.0 | | | | | | | |
| | THEGdME (Flash point 113° C.) DMTG | | | | | | 69.0 | | | 30.0 | | | |
| | TetraEGdME (Flash point 141° C.) | | | | | | | | | | 59.0 | | 9.0 |
| | TetraEGmBe (Flash point 177° C.) BTG-H | | | | | | | | | | | 59.0 | |
| Dispersant | Solsperse 17000 | | 4.0 | 4.0 | 4.0 | 4.0 | 4.0 | 4.0 | 4.0 | 4.0 | 4.0 | 4.0 | 4.0 |
| Surfactant | BYK340 | | 1.5 | 1.5 | 1.5 | 1.5 | 1.5 | 1.5 | 1.5 | 1.5 | 1.5 | 1.5 | 1.5 |
| Fixing resin | Solbin CL | | 1.5 | 1.5 | 1.5 | 1.5 | 1.5 | 1.5 | 1.5 | 1.5 | 1.5 | 1.5 | 1.5 |
| | Total | | 100 | 100 | 100 | 100 | 100 | 100 | 100 | 100 | 100 | 100 | 100 |
| Evaluation result | Weather durability | | 5 | 5 | 5 | 5 | 5 | 5 | 5 | 5 | 5 | 5 | 5 |
| | Printing stability (Intermittent evaluation) | | 4 | 4 | 4 | 4 | 4 | 4 | 4 | 4 | 4 | 4 | 4 |
| | Glossiness (Image quality) | | 2 | 3 | 4 | 4 | 4 | 4 | 3 | 4 | 4 | 4 | 4 |
| | Uneven aggregation | | 4 | 4 | 4 | 3 | 2 | 4 | 4 | 3 | 2 | 2 | 3 |
| | Rubbing resistance | | 3 | 3 | 3 | 3 | 3 | 1 | 3 | 3 | 2 | 2 | 3 |

TABLE 4

|  |  | Particle size [nm] | Comparative Example ||||||
|---|---|---|---|---|---|---|---|---|
|  |  |  | 1 | 2 | 3 | 4 | 5 | 6 |
| Pigment | PO-43 | 47 | 4.0 |  |  |  |  |  |
|  |  | 105 |  |  |  |  |  |  |
|  |  | 199 |  |  |  |  |  | 4.0 |
|  |  | 346 |  |  |  |  |  |  |
|  |  | 398 |  |  |  |  |  |  |
|  |  | 494 |  | 4.0 |  |  |  |  |
|  | PO-31 | 197 |  |  | 4.0 |  |  |  |
|  | PO-64 | 203 |  |  |  | 4.0 |  |  |
|  | PO-71 | 196 |  |  |  |  | 4.0 |  |
| Cyclic ester | Gamma-butyrolactone |  | 20.0 | 20.0 | 20.0 | 20.0 | 20.0 | 20.0 |
|  | Sigma-valerolactone |  |  |  |  |  |  |  |
| Solvent | DEGMEE (Flash point 64° C.) MEDG |  | 69.0 | 69.0 | 69.0 | 69.0 | 69.0 |  |
|  | DEGdME (Flash point 56° C.) |  |  |  |  |  |  |  |
|  | DEGDEE (Flash point 71° C.) DEDG |  |  |  |  |  |  |  |
|  | DEGBME (Flash point 94° C.) |  |  |  |  |  |  |  |
|  | TriEGdME (Flash point 113° C.) DMTG |  |  |  |  |  |  |  |
|  | TetraEGdME (Flash point 141° C.) |  |  |  |  |  |  | 69.0 |
|  | TetraEGmBe (Flash point 177° C.) BTG-H |  |  |  |  |  |  |  |
| Dispersant | Solsperse 17000 |  | 4.0 | 4.0 | 4.0 | 4.0 | 4.0 | 4.0 |
| Surfactant | BYK 340 |  | 1.5 | 1.5 | 1.5 | 1.5 | 1.5 | 1.5 |
| Fixing resin | Solbin CL |  | 1.5 | 1.5 | 1.5 | 1.5 | 1.5 | 1.5 |
|  | Total |  | 100 | 100 | 100 | 100 | 100 | 100 |
| Evaluation result | Weather durability |  | 2 | 5 | 2 | 1 | 2 | 5 |
|  | Printing stability (Intermittent evaluation) |  | 4 | 1 | 4 | 4 | 4 | 4 |
|  | Glossiness (image quality) |  | 4 | 4 | 4 | 4 | 4 | 4 |
|  | Uneven aggregation |  | 4 | 4 | 4 | 4 | 4 | 1 |
|  | Rubbing resistance |  | 3 | 1 | 3 | 3 | 3 | 3 |

Acronyms and trade names represented in Table 2 to Table 4 are given below.

Pigments
PO-43: C.I. Pigment Orange 43
PO-31: C.I. Pigment Orange 31
PO-64: C.I. Pigment Orange 64
PO-71: C.I. Pigment Orange 71

Cyclic Esters
γ-Butyrolactone: trade name, manufactured by KANTO CHEMICAL CO., INC.)
σ-Valerolactone: trade name, manufactured by KISHIDA CHEMICAL Co., Ltd.)

Solvents
DEGMEE: Diethylene glycol methyl ethyl ether, trade name "HISOLV EDM", manufactured by Toho Chemical Industry Co., Ltd., flash point 64° C.)
DEGdME: Diethylene glycol dimethyl ether, trade name "Diethylene glycol dimethyl ether", manufactured by Tokyo Chemical Industry Co., Ltd., flash point 56° C.)
DEGDEE: Diethylene glycol diethyl ether, trade name "Diethylene glycol diethyl ether", manufactured by Tokyo Chemical Industry Co., Ltd., flash point 71° C.)
DEGBME: Diethylene glycol butyl methyl ether, trade name "HISOLV BDM", manufactured by Toho Chemical Industry Co., Ltd., flash point 94° C.)
TriEGdME: Triethylene glycol dimethyl ether, trade name "Triethylene glycol dimethyl ether", manufactured by KISHIDA CHEMICAL Co., Ltd., flash point 113° C.)
TetraEGdME: Tetraethylene glycol dimethyl ether, trade name "Tetraethylene glycol dimethyl ether", manufactured by Tokyo Chemical Industry Co., Ltd., flash point 141° C.)
TetraEGmBE: Tetraethylene glycol monobutyl ether, trade name "Butycenol 40", MANUFACTURED BY KH NEO-CHEM Co., LTD., flash point 177° C.)

Dispersant
Solsperse 17000: trade name, manufactured by The Lubrizol Corporation, polyester polyamine Surfactant
BYK340: trade name, manufactured by BYK Japan KK, silicon-based surfactant Fixing Resin
Solbin CL: trade name, manufactured by Nissin Chemical Industry Co., Ltd, vinyl chloride-vinyl acetate copolymer The invention is not limited to the above-referenced embodiments, and various modifications can be made within the scope of the invention. The invention, for example, includes a configuration substantially the same (for example, a configuration having the same function, method, and result, or a configuration having the same purpose and effect) as a configuration described in the embodiments. The invention further includes a configuration with substitution of unessential element of the configuration described in the embodiments. The invention further includes a configuration providing the same action and effect, or a configuration achieving the same purpose as the configuration described in the embodiments. The invention further includes a configuration obtained by adding the related art to the configuration described in the embodiments.

The entire disclosure of Japanese Patent Application No.: 2014-217525, filed Oct. 24, 2014 and 2015-031892, filed Feb. 20, 2015 are expressly incorporated by reference herein.

What is claimed is:

1. An ink jet ink composition comprising a solvent containing at least one compound represented by the following general formula (1):

$$R^1O-(R^2O)_m-R^3 \quad (1)$$

wherein $R^1$ and $R^3$ each independently represent a hydrogen or an alkyl group having from 1 to 4 carbon atoms, $R^2$ represents an alkylene group having 2 or 3 carbon atoms, and m represents an integer of 2 or 3;

a pigment containing Pigment Orange-43 (PO-43) having a volume average particle size of 100 nm or more and 400 nm or less; and a dispersant selected from the group consisting of a polyalkylene polyamine, a salt of a long chain polyamino amid and a high molecular weight acid ester, a salt of a polyamino amide and a polar acid ester, and a polyester amine, wherein the ink jet ink composition comprises 5% by mass or more and 50% by mass or less of a cyclic ester based on the total mass of the ink jet ink composition.

2. The ink jet ink composition according to claim 1, wherein content of the pigment is 1% by mass or more and 6% by mass or less based on the total mass of the ink jet ink composition.

3. The ink jet ink composition according to claim 1, wherein the total content of the compound represented by general formula (1) is 10% by mass or more and 90% by mass or less based on the total mass of the ink jet ink composition.

4. The ink jet ink composition according to claim 1, comprising: 5% by mass or more and 40% by mass or less of a cyclic ester based on the total mass of the ink jet ink composition.

5. The ink jet ink composition according to claim 1, further comprising: a vinyl chloride-based polymer.

6. The ink jet ink composition according to claim 1 used for recording on a vinyl chloride-based recording medium.

7. An ink jet recording method for recording on a vinyl chloride-based recording medium by an ink jet method using the ink jet ink composition according to claim 1.

8. An ink jet recording method for recording on a vinyl chloride-based recording medium by an ink jet method using the ink jet ink composition according to claim 2.

9. An ink jet recording method for recording on a vinyl chloride-based recording medium by an ink jet method using the ink jet ink composition according to claim 3.

10. An ink jet recording method for recording on a vinyl chloride-based recording medium by an ink jet method using the ink jet ink composition according to claim 4.

11. An ink jet recording method for recording on a vinyl chloride-based recording medium by an ink jet method using the ink jet ink composition according to claim 5.

12. An ink jet recording method for recording on a vinyl chloride-based recording medium by an ink jet method using the ink jet ink composition according to claim 6.

13. The ink jet ink composition according to claim 1, wherein the ink jet ink composition comprises 10% by mass or more and 30% by mass or less of a cyclic ester based on the total mass of the ink jet ink composition.

* * * * *